(12) United States Patent
Tao

(10) Patent No.: US 11,368,622 B2
(45) Date of Patent: Jun. 21, 2022

(54) PHOTOGRAPHING METHOD, PHOTOGRAPHING DEVICE AND MOBILE TERMINAL FOR SHIFTING A LENS

(71) Applicant: ZTE CORPORATION, Guangdong (CN)

(72) Inventor: Ran Tao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 126 days.

(21) Appl. No.: 16/643,460

(22) PCT Filed: May 24, 2018

(86) PCT No.: PCT/CN2018/088185
§ 371 (c)(1),
(2) Date: Feb. 28, 2020

(87) PCT Pub. No.: WO2019/041905
PCT Pub. Date: Mar. 7, 2019

(65) Prior Publication Data
US 2020/0366845 A1    Nov. 19, 2020

(30) Foreign Application Priority Data
Aug. 29, 2017    (CN) .......................... 201710755147.5

(51) Int. Cl.
*H04N 5/232*    (2006.01)
*G02B 27/64*    (2006.01)

(52) U.S. Cl.
CPC ....... *H04N 5/23287* (2013.01); *G02B 27/646* (2013.01); *H04N 5/23248* (2013.01)

(58) Field of Classification Search
CPC ........... H04N 5/23254; H04N 5/23287; H04N 5/23248; H04N 5/2258; G02B 27/646
See application file for complete search history.

(56) References Cited

U.S. PATENT DOCUMENTS

2019/0028646 A1* 1/2019 Wang ........................ G06T 7/85

FOREIGN PATENT DOCUMENTS

WO    WO-2017120771 A1 *    7/2017    ......... H04N 5/23212

* cited by examiner

*Primary Examiner* — Nicholas G Giles
(74) *Attorney, Agent, or Firm* — Houtteman Law LLC

(57) ABSTRACT

A photographing method, a photographing device and a mobile terminal. The photographing method comprises steps of: acquiring, when a lens is at a first position, a first distance between a photographed object and the lens and a second distance by which the photographed object moves after the photographed object is projected on a photosensitive chip, wherein the first position is a position where the lens is located when the photographed object has the highest imaging definition; determining a second position of the lens after the lens is shifted from the first position according to the first distance and the second distance; and controlling the lens to move from the second position to the first position to photograph the photographed object.

19 Claims, 3 Drawing Sheets

PHOTOGRAPHING METHOD, PHOTOGRAPHING DEVICE AND MOBILE TERMINAL FOR SHIFTING A LENS

TECHNICAL FIELD

The disclosure relates to the field of terminal photographing, in particular to a photographing method, a photographing device and a mobile terminal.

BACKGROUND

The photographing anti-shake technique can effectively prevent a situation of picture blurring due to the movement of a photographer or hand shake. At present, this technology is generally applied to the field of mobile phone shooting, and with the rise of the dual-shot application, the requirement for the photographing anti-shake becomes more and more urgent.

The photographing anti-shake technique for the mobile phone camera mainly includes: Optical Image Stabilization (OIS) and Electronic Image Stabilization (EIS). The OIS module can realize the optical image stabilization by mainly using a special Voice Coil Motor/Voice Coil Actuator (VCM) and a gyroscope. The VCM can drive the lens to move in an imaging plane under the current drive. The gyroscope detects the shaking direction and the displacement of the mobile phone and feeds back a result to a controller, and the controller drives the VCM to cause the lens to move in an opposite direction by controlling the current, so that the optical image stabilization function can be realized. The EIS can move the entire imaging plane on the image sensor by detecting an amount of movement of the imaging screen.

OIS and EIS are capable of anti-shaking but have a number of disadvantages. For example, the VCM structure of the OIS module is complex, large in size, and requires an additional gyroscope on the module. As a result, the cost of OIS module is increased, which may be a primary factor limiting large-scale commercialization of OIS module. As another example, the core of OIS is a feedback system, and once the feedback system crashes, even normal photographing will be affected. For another example, the EIS needs to tailor a part of the edge pixels of the screen, which has a great influence on the imaging quality.

SUMMARY

The technical problem to be solved in the embodiments of the present disclosure is to provide a photographing method, a photographing device, and a mobile terminal.

In a first aspect, according to an embodiment of the present disclosure, there is provided a photographing method including: acquiring, when a lens is at a first position, a first distance between a photographed object and the lens and a second distance by which the photographed object moves after the photographed object is projected on a photosensitive chip, wherein the first position is a position where the lens is located when the photographed object has the highest imaging definition; determining a second position of the lens after the lens is shifted from the first position according to the first distance and the second distance; and controlling the lens to move from the second position to the first position to photograph the photographed object.

In a second aspect, according to an embodiment of the present disclosure, there is also provided a photographing device including: an acquisition module, configured to acquire, when a lens is at a first position, a first distance between a photographed object and the lens and a second distance by which the photographed object moves after the photographed object is projected on a photosensitive chip, wherein the first position is a position where the lens is located when the photographed object has the highest imaging definition; a determination module, configured to determine a second position of the lens after the lens is shifted from the first position according to the first distance and the second distance; and a control module, configured to control the lens to move from the second position to the first position to photograph the photographed object.

In a third aspect, according to an embodiment of the present disclosure, there is further provided a mobile terminal, including: a memory, a processor, and a computer executable program stored in the memory, where the processor implements the photographing method described above when executing the computer executable program.

DETAILED DESCRIPTION

In order that the technical problems, technical solutions and advantages to be solved by the present disclosure become apparent, detailed description will be provided with reference to the accompanying drawings and specific embodiments hereinafter. In the following description, specific details, such as specific configurations and components, are provided merely to facilitate a thorough understanding of embodiments of the disclosure. Accordingly, it will be apparent to those skilled in the art that various changes and modifications can be made to the embodiments described herein without departing from the scope and spirit of the disclosure. In addition, descriptions of well-known functions and constructions are omitted for clarity and conciseness.

Figure 1:
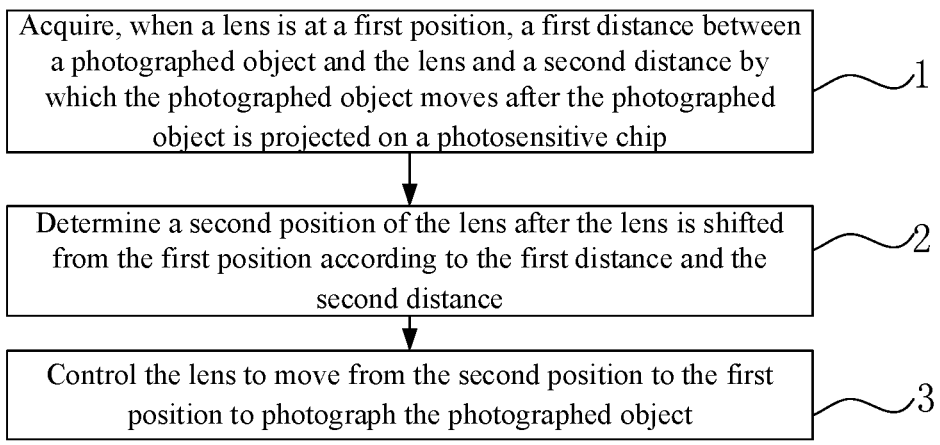
FIG. 1 is a flowchart illustrating a photographing method according to an embodiment of the disclosure.

Referring to FIG. 1, a photographing method according to an embodiment of the present disclosure includes:

Step 1, acquiring, when a lens is at a first position, a first distance between a photographed object and the lens and a second distance by which the photographed object moves after the photographed object is projected on a photosensitive chip, wherein the first position is a position where the lens is located when the photographed object has the highest imaging definition.

Specifically, prior to Step 1, the photographing method may further include: receiving a photographing instruction, controlling the lens to focus the photographed object according to the photographing instruction, and determining the first position of the lens when the photographed object has the highest imaging definition.

In the focusing process, the lens is gradually moved from the initial position until the lens moves to the position where the photographed object has the highest imaging definition, and the lens stops moving.

In this embodiment, by moving the lens to the first position, it is first ensured that the imaging definition of the object photographed by the lens is highest when no shaking or vibration occurs; when shaking or vibration occurs, the second position of the lens after the lens is shifted from the first position is determined by tracking a movement amount of the photographed object on the photosensitive chip in real time; by moving the lens in an opposite direction, the lens moves again to the first position where the photographed object has the highest imaging definition. As such, even if a shake occurs during photographing, the definition of the photograph can be ensured.

In the embodiment, it is not necessary to provide the VSM structure of the OIS module, or it is not necessary to additionally arrange the gyroscope on the module, such that the manufacturing cost can be reduced. Meanwhile, the photographing method according to the embodiment of the disclosure does not need to process the photographed picture, ensures that the photographed picture is more definite, and does not affect the imaging quality.

Figure 2:
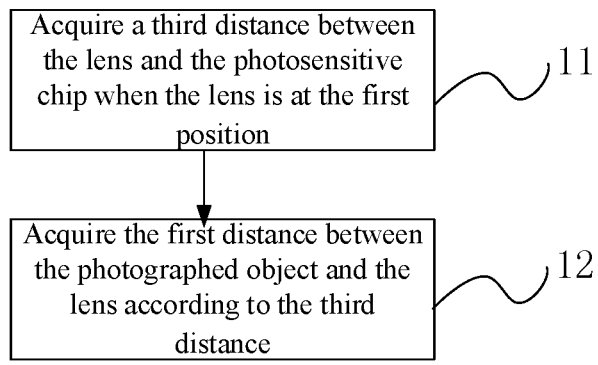
FIG. 2 is a flowchart illustrating Step 1 of the photographing method according to the embodiment of the disclosure.

In an exemplary embodiment, referring to FIG. 2, when the lens is included in a single-lens camera, the step of acquiring a first distance between the photographed object and the lens when the lens is at the first position includes:

Step 11, acquiring a third distance between the lens and the photosensitive chip when the lens is at the first position; and Step 12, calculating the first distance between the photographed object and the lens according to the third distance.

Figure 3:
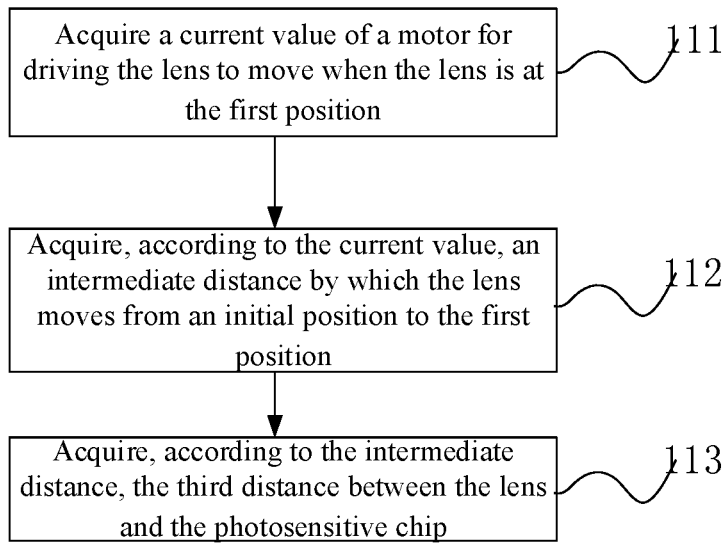
FIG. 3 is a flowchart illustrating Step 11 of the photographing method according to the embodiment of the disclosure.

Referring to FIG. 3, in an exemplary embodiment, Step 11 includes:

Step 111, acquiring a current value of a motor for driving the lens to move when the lens is at the first position;

Step 112, calculating, according to the current value, an intermediate distance by which the lens moves from an initial position to the first position; and Step 113, calculating, according to the intermediate distance, the third distance between the lens and the photosensitive chip.

Specifically, Step 112 includes:

using a formula: $D=(M-M1)/(M2-M1)*k$ to calculate the intermediate distance, where D is the intermediate distance, M is a current value of a motor driving the lens to move, M1 is a motor focusing current value when a focal length of the lens is at infinity, M2 is a motor focusing current value when the focal length of the lens is at a macro position, and k is a lens shift distance corresponding to the lens at the macro position.

Here, M2 is the motor focusing current value corresponding to the closest focus distance allowed by the lens, and k is the lens shift distance corresponding to the position of the lens at the closest focus distance. The lens shift distance k can be obtained from a lens depth-of-field table.

Specifically, Step 113 includes:

using a formula: $r=D+f$ to calculate the first distance, where r is the first distance, D is the intermediate distance, and f is the focal length of the lens.

Specifically, Step 12 includes:

using a formula: $R=rf/(r-f)$ to calculate the first distance, wherein R is the first distance, r is the third distance, and f is the focal length of the lens.

Here, the first distance is obtained by conversion according to the lens imaging principle.

Figure 4:
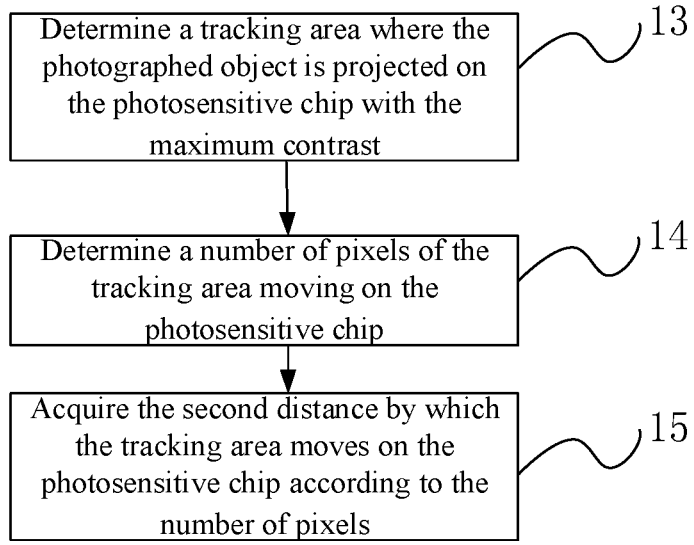
FIG. 4 is another flowchart illustrating Step 1 of the photographing method according to the embodiment of the disclosure.

Specifically, referring to FIG. 4, the step of acquiring the second distance by which the photographed object moves after the photographed object is projected on a photosensitive chip when the lens is at the first position includes:

Step 13, determining a tracking area where the photographed object is projected on the photosensitive chip with the maximum contrast;

Step 14, determining a number of pixels of the tracking area moving on the photosensitive chip; and Step 15, acquiring the second distance by which the tracking area moves on the photosensitive chip according to the number of pixels.

At Step 13, the tracking area with the maximum contrast may be an area where a center point of the photographed object is located, or an area specified empirically.

Specifically, Step 15 includes:

using a formula: $d=n*m$ to calculate the third distance, where d is the third distance, n is the number of pixels of the tracking area moving on the photosensitive chip, and m is a width of each pixel.

In the embodiment of the present disclosure, when the lens is included in a dual-lens camera, the first distance may be calculated by using a distance measurement function of the dual-lens camera.

Figure 5:
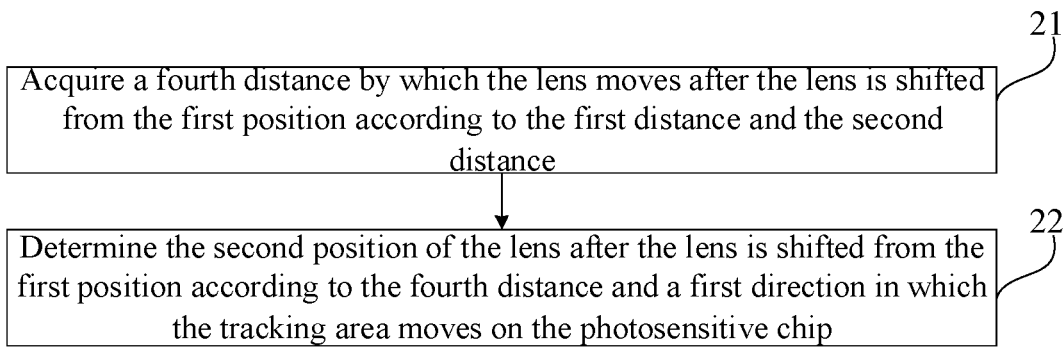
FIG. 5 is a flowchart illustrating Step 2 of the photographing method according to the embodiment of the disclosure.

According to an embodiment of the present disclosure, the photographing method further includes: Step 2, determining a second position of the lens after the lens is shifted from the first position according to the first distance and the second distance. Referring to FIG. 5, in one exemplary embodiment, Step 2 includes:

Step 21, acquiring a fourth distance by which the lens moves after the lens is shifted from the first position according to the first distance and the second distance; and Step 22, determining the second position of the lens after the lens is shifted from the first position according to the fourth distance and a first direction in which the tracking area moves on the photosensitive chip.

At Step 21, since the position of the photographed object is fixed, the cause of the shift at the position of the tracking area projected on the photosensitive chip is a shake. After the occurrence of the shake, the lens may move in an x-direction and/or a y-direction. At this time, the lens is shifted from the first position of the photographed object having the highest imaging definition. It should be ensured that the lens needs to be moved back to the first position after the occurrence of the shake.

In order to move the lens back to the first position, it is necessary to obtain the fourth distance by which the lens is shifted from the first position and the direction in which the lens is shifted. In this embodiment, the direction in which the lens is shifted from the first position is the same as the direction in which the tracking area moves on the photosensitive chip. Therefore, when the direction in which the tracking area moves on the photosensitive chip is determined, the direction in which the lens is shifted from the first position is also obtained.

In the embodiment of the disclosure, if the tracking area moves in both x and y directions, the fourth distance by which the lens moves when the lens is shifted from the first position can include a distance by which the lens moves in the x direction and the distance by which the lens moves in the y direction.

Specifically, Step 21 includes:

using a formula: $x=R/(R+r)*d$ to calculate the fourth distance, where x is the fourth distance, R is the first distance, d is the second distance, and r is the third distance.

Figure 6:
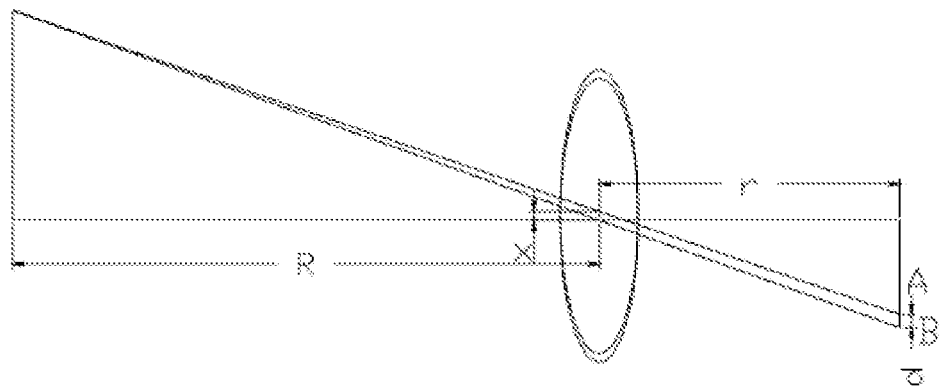
FIG. 6 is a schematic diagram illustrating a displacement of a lens from a first position to a second position for imaging according to an embodiment of the disclosure.

In FIG. 6, A is an initial position of the tracking area projected on the photosensitive chip, B is a position of the tracking area after the tracking area moves on the photosensitive chip due to the shake, and a distance between A and B is the second distance. After the projection of the tracking area on the photosensitive chip moves, the lens also shifts in the direction of the movement of the tracking area according to the imaging principle. In FIG. 4, when the tracking area is shifted by a second distance d, the fourth distance by which the lens moves in the direction is x. In the present disclosure, the fourth distance may be obtained by conversion based on a mirror imaging principle.

According to an embodiment of the present disclosure, the photographing method further includes: Step 3, controlling the lens to move from the second position to the first position to photograph the photographed object.

Figure 7:
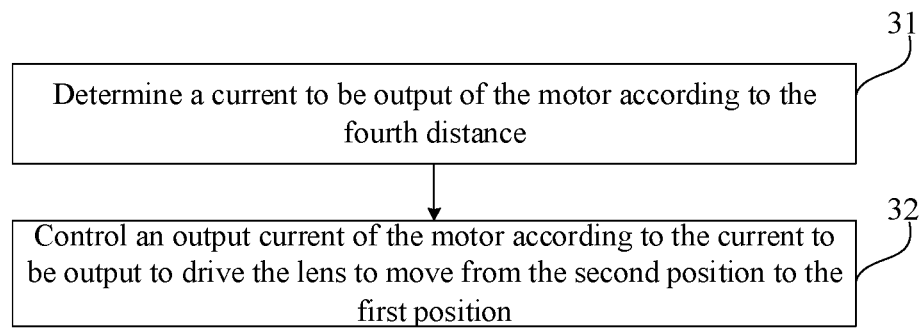
FIG. 7 is a flowchart illustrating Step 3 of the photographing method according to the embodiment of the disclosure.

Referring to FIG. 7, in one exemplary embodiment, Step 3 includes:

Step 31, determining a current to be output of the motor according to the fourth distance; and Step 32, controlling an output current of the motor according to the current to be output to drive the lens to move from the second position to the first position.

If the moving direction of the tracking area on the photosensitive chip includes both the x direction and the y direction, the fourth distance obtained in Step 21 may include a moving distance of the lens in the x direction and a moving distance in the y direction. Further, the current to be output of the motor determined at Step 31 includes the current to be output in the x direction and the current to be output in the y direction. At Step 32, it is necessary to control the output current of the motor in the x direction first, and then control the output current in the y direction; or to control the output current in the y direction first and then control the output current in the x direction. Therefore, the lens can be smoothly moved back to the first position from the second position.

Specifically, Step 31 includes:

using a formula: $i=x*i\_0$ to calculate the current to be output i of the motor, wherein i is the current to be output of the motor, x is the fourth distance, and i_0 is a current value required to be output by the motor when the lens moves by a unit distance.

Next, the photographing method according to the embodiment of the present disclosure is explained by a specific example.

It is supposed that, each pixel width in the camera m=1.12 μm, a focal length of the lens f=3.8 mm, a supportable closest focusing distance of the lens is 8 cm, a lens shift distance corresponding to the closest focusing distance is 190 μm, a motor focusing current value corresponding to the closest focusing distance M2=320, and a motor focusing current value corresponding to the lens at the infinite position M1=120. In addition, the current corresponding to the initial position of the lens in the x and y directions is 0, and the current corresponding to the movement of 100 μm in the four directions (+x, +y, −x and −y directions) is 50 mA. After the camera is turned on to start capturing, a current value M=200 corresponding to the motor can be obtained when the photographed object has the highest imaging definition. Further, it is assumed that, during the photographing, a movement amount of the tracking area is detected to be 3 pixels, and the direction is the −x direction.

It could be possible to obtain from the above data: the intermediate distance D by which the lens moves from the initial position to the first position in the z-axis direction, i.e., D=(200−120)/(320−120)*190 μm=36 μm=0.036 mm; the third distance r between the lens and the photosensitive chip, i.e., r=3.8 mm+0.036 mm=3.836 mm; the first distance R between the photographed object and the lens, i.e., R=(3.836 mm×3.8 mm)/0.036 mm=400 mm; when the shake occurs, the second distance d by which the tracking area moves on the photosensitive chip, i.e., d=3*0.00112 mm=0.00336 mm, and the the fourth distance x by which the lens is shifted from the first position to the second position, i.e., x=400 mm/(400 mm+3.836 mm)*0.00336 mm=3.32 μm. In other words, when the shake occurs, the lens moves by the distance of 3.32 μm in the −x direction. In order to make the captured picture with the highest definition after the shake occurs, the lens should be controlled to reversely move by 3.32 μm in the +x direction so as to move from the second position back to the position (i.e., the first position) where the photographed object has the highest imaging definition.

Since the initial position of the lens in the x and y directions corresponds to the current of 0, the current corresponding to the movement of 100 μm in the four directions is 50 mA. The current i_0 required to be output by the motor for moving the lens by the unit distance can be obtained, i.e., i_0=50 mA/100 μm=0.5 mA/μm; further, a current i required to drive the lens to move 3.32 μm, i.e., i=3.32 μm*0.5 mA/μm=1.66 mA. In other words, the motor needs to output a current of 1.66 mA to drive the lens to move from the second position to the first position.

Through the photographing method according to the embodiment of the disclosure, the anti-shake effect of photographing can be realized such that the definition of the photo can be ensured.

Figure 8:
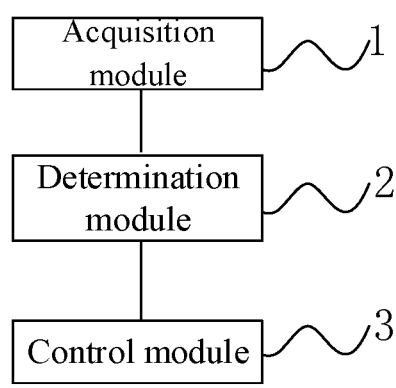
FIG. 8 is a schematic structural diagram illustrating a photographing device according to an embodiment of the disclosure.

Referring to FIG. 8, according to an embodiment of the present disclosure, there is also provided a photographing device, including: an acquisition module 1, a determination module 2 and a control module 3.

The acquisition module 1 is configured to acquire, when a lens is at a first position, a first distance between a photographed object and the lens and a second distance by which the photographed object moves after the photographed object is projected on a photosensitive chip, wherein the first position is a position where the lens is located when the photographed object has the highest imaging definition.

The determination module 2 is configured to determine a second position of the lens after the lens is shifted from the first position according to the first distance and the second distance.

The control module 3 is configured to control the lens to move from the second position to the first position to photograph the photographed object.

Preferably, when the lens is included in a single-lens camera, the determination module includes: a first acquisition unit and a second acquisition unit.

The first acquisition unit is configured to acquire a third distance between the lens and the photosensitive chip when the lens is at the first position.

The second acquisition unit is configured to acquire the first distance between the photographed object and the lens according to the third distance.

Preferably, the first acquisition unit includes: a first acquisition sub-unit, a second acquisition sub-unit and a third acquisition sub-unit.

The first acquisition sub-unit is configured to acquire a current value of a motor for driving the lens to move when the lens is at the first position.

The second acquisition sub-unit configured to calculate, according to the current value, an intermediate distance by which the lens moves from an initial position to the first position.

The third acquisition sub-unit is configured to calculate, according to the intermediate distance, the third distance between the lens and the photosensitive chip.

Preferably, the acquisition module further includes: a first determination unit, a second determination unit and a third acquisition unit.

The first determination unit is configured to determine a tracking area where the photographed object is projected on the photosensitive chip with the maximum contrast.

The second determination unit is configured to determine a number of pixels of the tracking area moving on the photosensitive chip.

The third acquisition unit is configured to acquire the second distance by which the tracking area moves on the photosensitive chip according to the number of pixels.

Preferably, the determination module includes: a fourth acquisition unit and a third determination unit.

The fourth acquisition unit is configured to acquire a fourth distance by which the lens moves after the lens is shifted from the first position according to the first distance and the second distance.

The third determination unit is configured to determine the second position of the lens after the lens is shifted from the first position according to the fourth distance and a first direction in which the tracking area moves on the photosensitive chip.

Preferably, the control module includes: a fourth determination unit and a control unit.

The fourth determination unit is configured to determine a current to be output of the motor according to the fourth distance.

The control unit is configured to control an output current of a motor according to the current to be output to drive the lens to move from the second position to the first position.

The photographing device according to the embodiment of the disclosure corresponds to the photographing method. All the implementation modes in the photographing method are also suitable for the photographing device to achieve the same technical effect. Therefore, the photographing device can achieve the anti-shake effect of photographing and ensure the definition of the photos.

According to an embodiment of the present disclosure, there is further provided a mobile terminal, including a memory, a processor, and a computer executable program stored in the memory, wherein the processor implements the photographing method described above when executing the computer executable program.

Described above are preferred embodiments of the present disclosure. It should be noted that modifications and variations can be made by those skilled in the art without departing from the principles described in the present disclosure, and these modifications and variations should also be constructed within the scope of the present disclosure.

What is claimed is:

1. A photographing method, comprising:
   acquiring, when a lens is at a first position, a first distance between a photographed object and the lens and a second distance by which the photographed object moves on a photosensitive chip after the photographed object is projected on the photosensitive chip, wherein the first position is a position where the lens is located when the photographed object has the highest imaging definition;
   determining a second position of the lens after the lens is shifted from the first position according to the first distance and the second distance; and
   controlling the lens to move from the second position to the first position to photograph the photographed object.

2. The photographing method according to claim 1, wherein when the lens is included in a single-lens camera, the step of acquiring, when the lens is at the first position, the first distance between the photographed object and the lens comprises:
   acquiring a third distance between the lens and the photosensitive chip when the lens is at the first position; and
   calculating the first distance between the photographed object and the lens according to the third distance.

3. The photographing method according to claim 2, wherein the step of acquiring the third distance between the lens and the photosensitive chip when the lens is at the first position comprises:
   acquiring a current value of a motor for driving the lens to move when the lens is at the first position;
   calculating, according to the current value, an intermediate distance by which the lens moves from an initial position to the first position; and
   calculating, according to the intermediate distance, the third distance between the lens and the photosensitive chip.

4. The photographing method according to claim 1, wherein the step of acquiring the second distance by which the photographed object moves after the photographed object is projected on the photosensitive chip comprises:
   determining a tracking area where the photographed object is projected on the photosensitive chip with the maximum contrast;
   determining a number of pixels of the tracking area moving on the photosensitive chip; and
   acquiring the second distance by which the tracking area moves on the photosensitive chip according to the number of pixels.

5. The photographing method according to claim 4, wherein the step of determining the second position of the lens after the lens is shifted from the first position according to the first distance and the second distance comprises:
   acquiring a fourth distance by which the lens moves after the lens is shifted from the first position according to the first distance and the second distance; and
   determining the second position of the lens after the lens is shifted from the first position according to the fourth distance and a first direction in which the tracking area moves on the photosensitive chip.

6. The photographing method according to claim 5, wherein the step of controlling the lens to move from the second position to the first position comprises:
   determining a current to be output of the motor according to the fourth distance; and controlling an output current of a motor according to the current to be output to drive the lens to move from the second position to the first position.

7. A photographing device, comprising:
an acquisition module configured to acquire, when a lens is at a first position, a first distance between a photographed object and the lens and a second distance by which the photographed object moves on a photosensitive chip after the photographed object is projected on the photosensitive chip, wherein the first position is a position where the lens is located when the photographed object has the highest imaging definition;
a determination module configured to determine a second position of the lens after the lens is shifted from the first position according to the first distance and the second distance; and
a control module configured to control the lens to move from the second position to the first position to photograph the photographed object.

8. The photographing device according to claim 7, wherein when the lens is included in a single-lens camera, the determination module comprises:
a first acquisition unit configured to acquire a third distance between the lens and the photosensitive chip when the lens is at the first position; and
a second acquisition unit configured to acquire the first distance between the photographed object and the lens according to the third distance.

9. The photographing device according to claim 8, wherein the first acquisition unit comprises:
a first acquisition sub-unit configured to acquire a current value of a motor for driving the lens to move when the lens is at the first position;
a second acquisition sub-unit configured to calculate, according to the current value, an intermediate distance by which the lens moves from an initial position to the first position; and
a third acquisition sub-unit configured to calculate, according to the intermediate distance, the third distance between the lens and the photosensitive chip.

10. The photographing device according to claim 7, wherein the acquisition module further comprises:
a first determination unit configured to determine a tracking area where the photographed object is projected on the photosensitive chip with the maximum contrast;
a second determination unit configured to determine a number of pixels of the tracking area moving on the photosensitive chip; and
a third acquisition unit configured to acquire the second distance by which the tracking area moves on the photosensitive chip according to the number of pixels.

11. The photographing device according to claim 10, wherein the determination module comprises:
a fourth acquisition unit configured to acquire a fourth distance by which the lens moves after the lens is shifted from the first position according to the first distance and the second distance; and
a third determination unit configured to determine the second position of the lens after the lens is shifted from the first position according to the fourth distance and a first direction in which the tracking area moves on the photosensitive chip.

12. The photographing device according to claim 11, wherein the control module comprises:
a fourth determination unit configured to determine a current to be output of the motor according to the fourth distance; and a control unit configured to control an output current of a motor according to the current to be output to drive the lens to move from the second position to the first position.

13. A mobile terminal comprising a memory, a processor and a computer executable program stored in the memory, wherein the processor, when executing the computer executable program, implements the photographing method according to claim 1.

14. The photographing method according to claim 3, wherein the step of acquiring the second distance by which the photographed object moves after the photographed object is projected on the photosensitive chip comprises:
determining a tracking area where the photographed object is projected on the photosensitive chip with the maximum contrast;
determining a number of pixels of the tracking area moving on the photosensitive chip; and
acquiring the second distance by which the tracking area moves on the photosensitive chip according to the number of pixels.

15. The photographing method according to claim 14, wherein the step of determining the second position of the lens after the lens is shifted from the first position according to the first distance and the second distance comprises:
acquiring a fourth distance by which the lens moves after the lens is shifted from the first position according to the first distance and the second distance; and
determining the second position of the lens after the lens is shifted from the first position according to the fourth distance and a first direction in which the tracking area moves on the photosensitive chip.

16. The photographing method according to claim 15, wherein the step of controlling the lens to move from the second position to the first position comprises:
determining a current to be output of the motor according to the fourth distance; and
controlling an output current of a motor according to the current to be output to drive the lens to move from the second position to the first position.

17. The photographing device according to claim 9, wherein the acquisition module further comprises:
a first determination unit configured to determine a tracking area where the photographed object is projected on the photosensitive chip with the maximum contrast;
a second determination unit configured to determine a number of pixels of the tracking area moving on the photosensitive chip; and
a third acquisition unit configured to acquire the second distance by which the tracking area moves on the photosensitive chip according to the number of pixels.

18. The photographing device according to claim 17, wherein the determination module comprises:
a fourth acquisition unit configured to acquire a fourth distance by which the lens moves after the lens is shifted from the first position according to the first distance and the second distance; and
a third determination unit configured to determine the second position of the lens after the lens is shifted from the first position according to the fourth distance and a first direction in which the tracking area moves on the photosensitive chip.

19. The photographing device according to claim 18, wherein the control module comprises:
a fourth determination unit configured to determine a current to be output of the motor according to the fourth distance; and a control unit configured to control an output current of a motor according to the current to be output to drive the lens to move from the second position to the first position.

* * * * *